United States Patent
Genereux et al.

[11] Patent Number: 5,966,783
[45] Date of Patent: Oct. 19, 1999

[54] SUNGLASSES AND ARTICLE RETAINER

[76] Inventors: Carrol H. Genereux, Mission Station 1050 Kiely Blvd., Santa Clara, Calif. 95051; James R. Conrad, 1518 Moffett St., Salinas, Calif. 93905

[21] Appl. No.: 08/232,947

[22] Filed: Apr. 25, 1994

[51] Int. Cl.[6] .................................................. A44B 21/00
[52] U.S. Cl. ................................................ 24/557; 24/562
[58] Field of Search ........................ 24/545, 563, 67.11, 24/557, 555, 562, 565; 248/902, 231.8, 225.3, 229; 224/312

[56] References Cited

U.S. PATENT DOCUMENTS

| | | | |
|---|---|---|---|
| 216,657 | 6/1879 | Cochrane | 24/67.11 X |
| 225,652 | 3/1880 | Simonds | 24/545 X |
| D. 310,301 | 9/1990 | Burrow | D3/34 |
| 451,925 | 5/1891 | Fritz | 24/545 X |
| 756,535 | 4/1904 | Senderling | 24/557 X |
| 1,422,658 | 7/1922 | Brooks | 24/563 X |
| 1,661,576 | 3/1928 | Purllant | 24/563 |
| 1,696,908 | 1/1929 | Fricker | 24/67.11 |
| 2,149,796 | 3/1939 | Smith | 40/11 |
| 2,429,557 | 10/1947 | Maccaferri | 24/562 |
| 2,481,952 | 9/1949 | Schwartz et al. | 24/557 X |
| 2,826,387 | 3/1958 | Rutten | 248/229 |
| 2,861,309 | 11/1958 | Savolides | 24/66 |
| 3,300,168 | 1/1967 | Gaudino | 248/231.8 X |
| 3,968,546 | 7/1976 | Seaborn et al. | 24/67.11 X |
| 4,090,733 | 5/1978 | Altschul | 24/562 X |
| 4,167,287 | 9/1979 | Franklin | 296/97 C |
| 4,646,394 | 3/1987 | Krauss | 24/563 X |
| 4,715,575 | 12/1987 | Kamerer | 248/309.1 |
| 4,878,641 | 11/1989 | Vogt | 248/309.1 |
| 4,889,380 | 12/1989 | Pillifant | 296/97.6 |
| 5,082,225 | 1/1992 | Nespoli | 248/231.8 |
| 5,098,150 | 3/1992 | Vandenberge | 296/97.2 |
| 5,195,668 | 3/1993 | Kunes et al. | 224/312 |
| 5,314,151 | 5/1994 | Carter-Mann | 248/231.8 X |
| 5,340,071 | 8/1994 | Fox, II | 248/231.8 |
| 5,407,159 | 4/1995 | Polmanteer et al. | 248/231.8 X |

FOREIGN PATENT DOCUMENTS

| | | | |
|---|---|---|---|
| 52210 | 10/1943 | France | 24/557 |
| 1527582 | 5/1968 | France | 24/557 |
| 165200 | 11/1958 | Sweden | 24/557 |

Primary Examiner—James R. Brittain
Attorney, Agent, or Firm—Louis J. Bachand

[57] ABSTRACT

A clasp-like device for securing sunglasses or other articles to sunvisors or other acceptable surfaces. This is accomplished by installing the sunglass temples between one of the device jaws and the sunvisor. The device is opened by applying pressure to a lever that is located near the intersection of the device jaws. On the inner surface of a device jaw nubs can be placed, if required, to aid in the securing of sunglasses or other articles in position. The device can also be held in position by a device retainer which can be mounted where there are unacceptable surfaces by using two-faced adhesive or a screw. The device is made of injection molded glass reinforced nylon or similar material for holding tension.

5 Claims, 3 Drawing Sheets

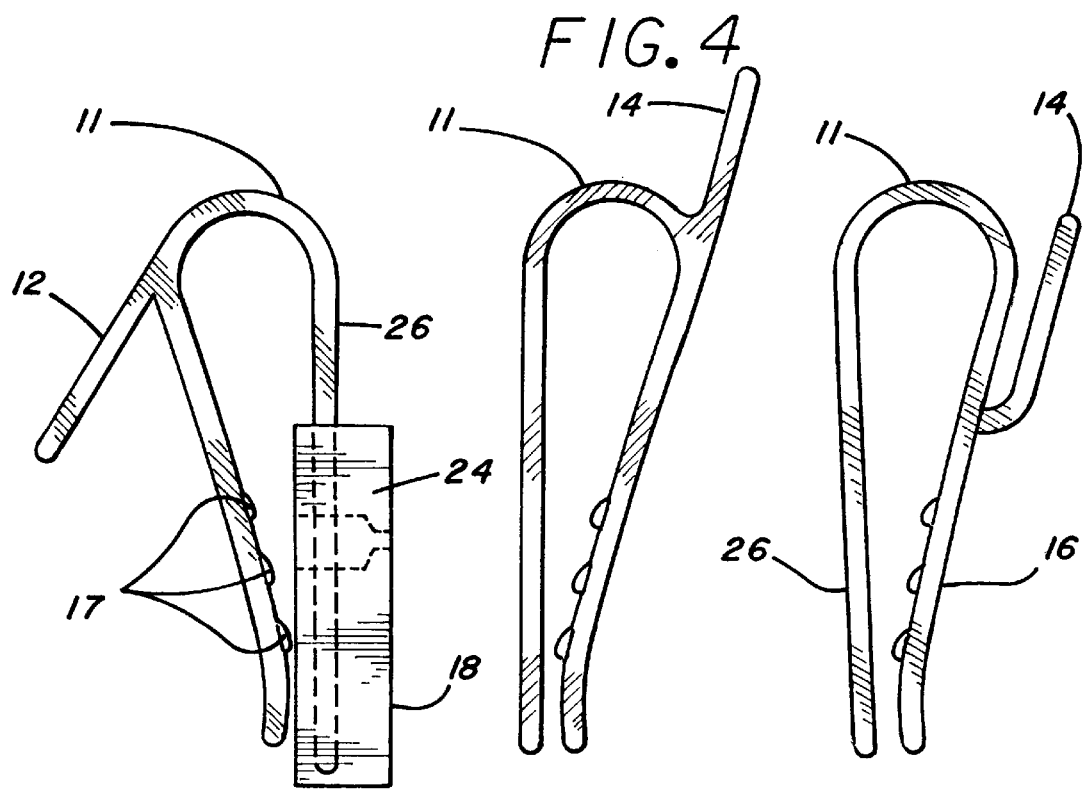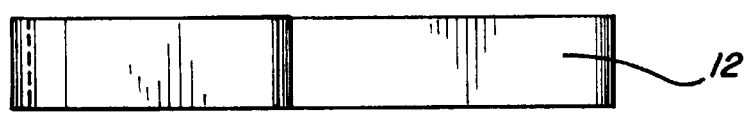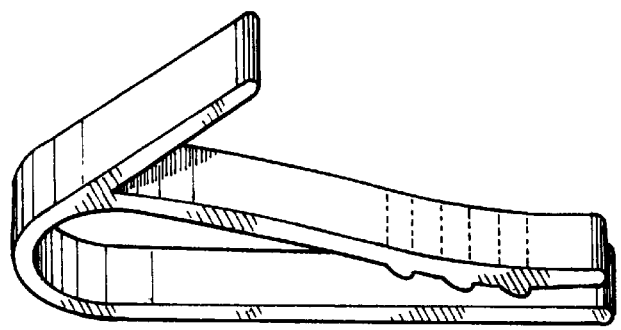

SUNGLASSES AND ARTICLE RETAINER

DESCRIPTION OF INVENTION

This invention is a device to be used for securing sunglasses or other articles. The device can be clamped over a sunvisor or placed in a detachable retainer.

SUMMARY OF THE INVENTION

The intent of this device is to be able to receive all styles of sun or eyeglasses, yet not be bulky or unsafe. This is accomplished by installing only the temples in the device. Designed into this device is the ability to remove sunglasses from it by the use of one hand while vehicle is in operation. This device can also be used to secure other articles in place on a sunvisor or other acceptable mounting surfaces. Also the device can be used along with a detachable retainer that can be mounted on surfaces using a screw or two-faced adhesive. Other objects to this invention will become more apparent upon further study of the drawings and descriptions. Based on the basic design, the size and shape can be varied to accommodate device needs. Glass reinforced nylon or other similar materials including metals give this device the clamping strength needed for safe use.

BRIEF DESCRIPTION OF THE DRAWINGS

FIG. 3 shows a side view of a device mounted in a detachable retainer.

FIGS. 4 and 5 show side views of a device with alternate lever positions.

FIG. 6 shows a top view of a device.

FIG. 7 shows a isometric view of a device.

Figure 1:
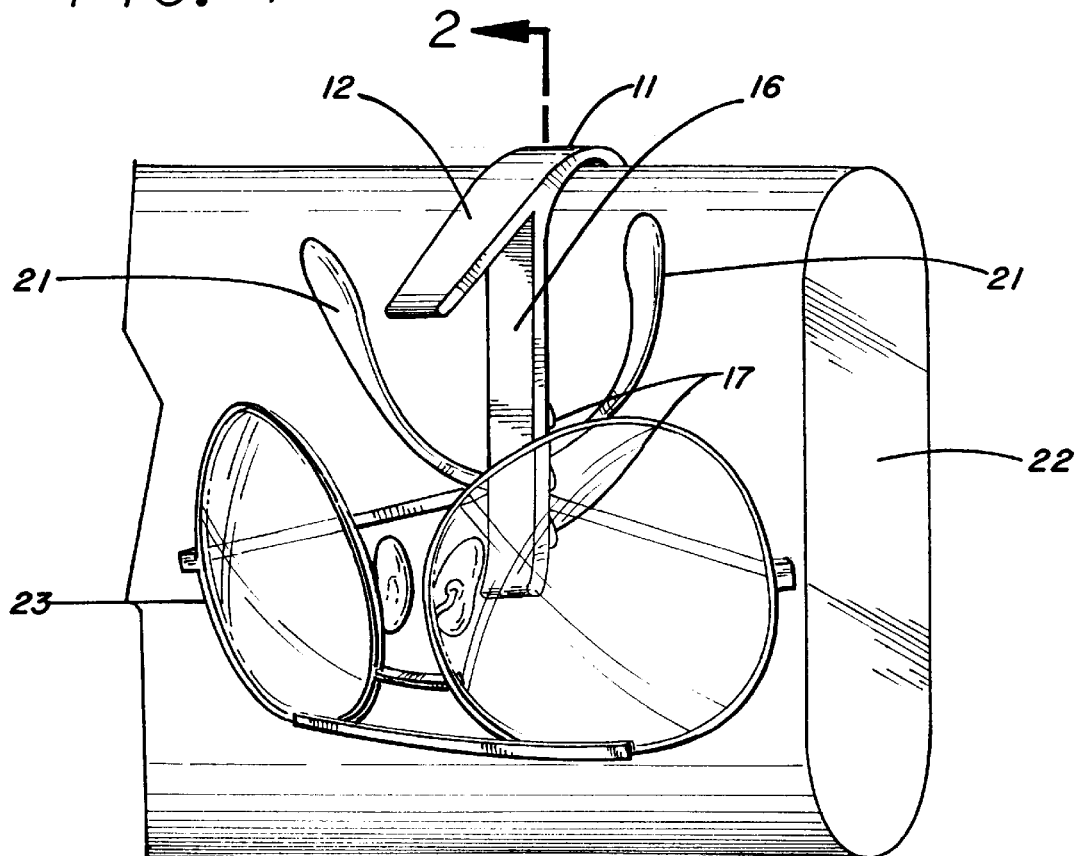
FIG. 1 shows a isometric view of a device mounted on a sunvisor with sunglasses secured in place by the temples.

| REFERENCE NUMERALS IN DRAWING | |
|---|---|
| 11 | device body |
| 12 | lever |
| 14 | alternate levers |
| 16 | movable jaw of the device |
| 17 | oblong nubs |
| 18 | two-faced adhesive |
| 19 | opening for mounting screw |
| 20 | opening in retainer |
| 21 | sunglass temples |
| 22 | visor |
| 23 | sunglasses |
| 24 | device retainer |
| 26 | stationary jaw |

DETAILED DESCRIPTION OF THE INVENTION

FIG. 1 is a isometric view of the device 11 in position on sunvisor 22 securing a pair of sunglasses 23 to a visor. A pair of glasses 23 is secured in position by placing a pair of temples 21 between visor 22 and movable jaw 16 by actuating lever 12. A pair of temples 21 is held in a secure position by oblong nubs 17.

Figure 2:
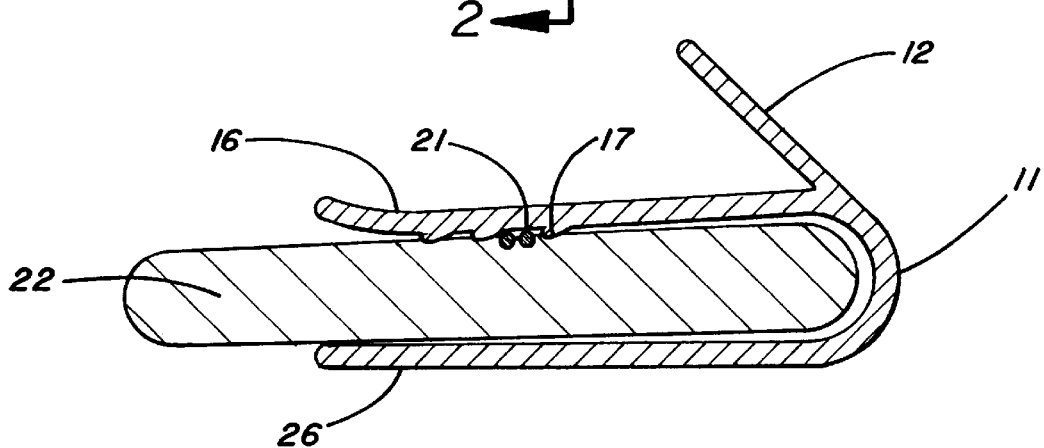
FIG. 2 is a side view of a device mounted on a sunvisor.

FIG. 2 shows jaws 16 and 26 clamped over sunvisor 22 and holding sunglass temples 21 in place by oblong nubs 17. Glass reinforced nylon or similar materials give device 11 the clamping strength and memory required.

FIG. 3 shows device 11 mounted in device retainer 24. Stationary jaw 26 and retainer 24 are able to vary in design to meet device needs.

FIGS. 4 and 5 shows devices with two of the many alternate levers 14 that could be used for other applications. Along with levers 14, jaws 16 and 26 can be varied in size and shape as needed.

FIG. 6 shows top view of device 11 with lever 12 shown.

FIG. 7 shows a isometric view of a device 11 and the outline of nubs 17 used for securing sunglasses or other articles in position.

Figure 8:
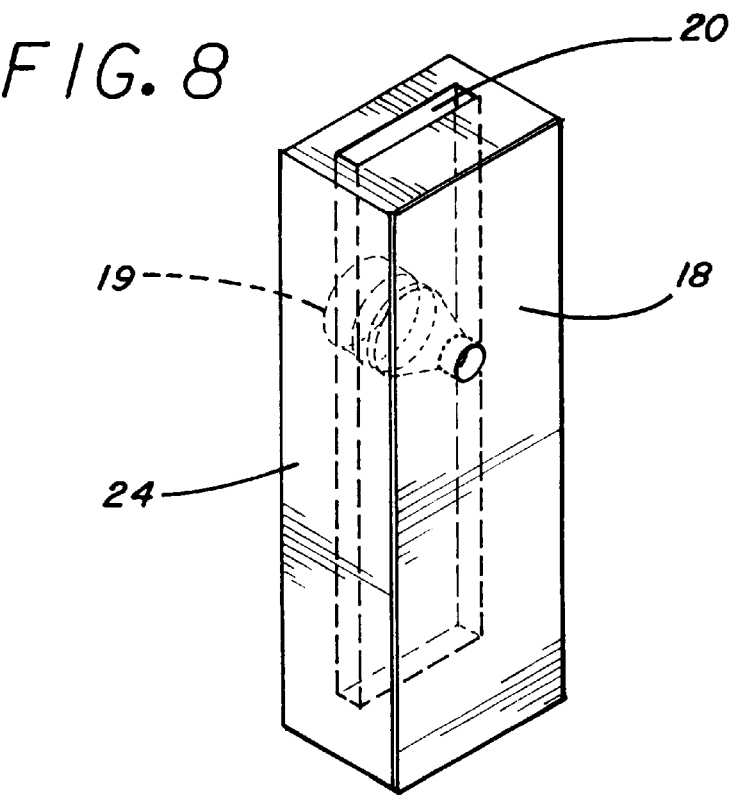
FIG. 8 shows a isometric view of a device retainer.
Figure 9:
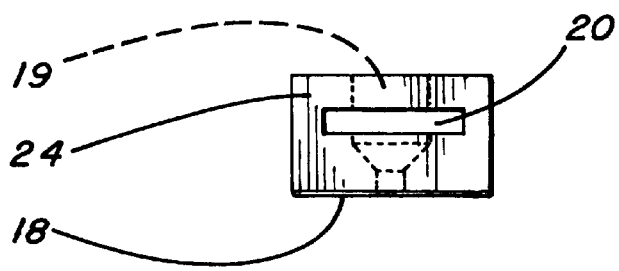
FIG. 9 shows a top view of a device retainer.

FIGS. 8 and 9 show device retainer 24 with opening 20 to receive stationary jaw 26 and two-faced adhesive 18 to secure retainer in position.

Figure 10:
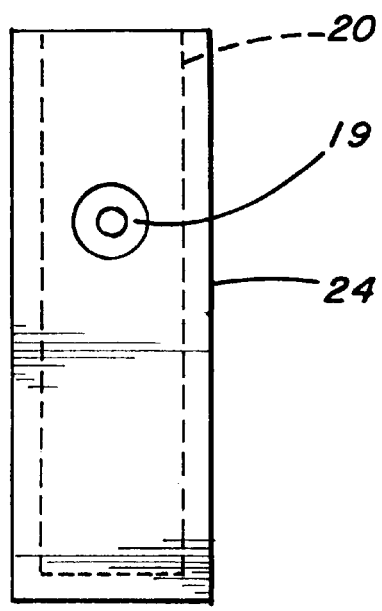
FIG. 10 shows a front view of a device retainer.

FIGS. 9 and 10 show that retainer 24 can be mounted with a screw placed through countersunk opening 9 into mounting surface.

What is claimed is:

1. A clip for securing sunglasses and like articles to a vehicle sunvisor comprising a pair of longitudinally extended jaws extending from a common base in opposed relation along substantially their entire lengths and arranged for clasping a sunvisor therebetween, one of said jaws being separable from said sunvisor a plurality of nubs along said one jaw longitudinally spaced to receive said articles therebetween in mounting relation to said sunvisor, each of said nubs having a differential camming surface preferentially facilitating sliding of said articles out of position between said nubs over sliding into position between said nubs, and a lever extending from one of said jaws for pivoting said one jaw relative to the sunvisor a distance which taken with said preferential camming surface of said nubs allows said articles to pass readily into or out of position between said nubs.

2. The clip according to claim 1, in which said clip common base is curved, said jaws having their longitudinal axis tangential to said common base.

3. The clip according to claim 1, in which said lever is mounted on said one jaw at an angle to said other jaw, said angle increasing with actuation of said lever.

4. The clip according to claim 1, in which said lever increases in distance from said one jaw as said lever increases in length.

5. The clip according to claim 1, in which said jaws extend without touching outward from said common base.

* * * * *